United States Patent

Spani

[15] 3,706,880

[45] Dec. 19, 1972

[54] BCD TO EXCESS 3 CODE CONVERTER

[72] Inventor: Wayne Spani, San Diego, Calif.

[73] Assignee: Eastman Kodak Company, Rochester, N.Y.

[22] Filed: March 16, 1971

[21] Appl. No.: 124,683

[52] U.S. Cl. ..............................235/155, 340/347 DD

[51] Int. Cl. ................................................H04l 3/00

[58] Field of Search...........235/155, 92; 340/347 DD

[56] References Cited

UNITED STATES PATENTS

| | | | |
|---|---|---|---|
| 2,877,447 | 3/1959 | Kenrich | 335/155 |
| 3,153,228 | 10/1964 | Winkler | 235/155 |

OTHER PUBLICATIONS

Frim & Miller, "Here Are More Digital Converters," Electronic Design 25, Dec. 6, 1969 pg 86, Scientific Library

*Primary Examiner*—Daryl W. Cook
*Assistant Examiner*—Jeremiah Glassman
*Attorney*—W. H. J. Kline and Raymond L. Owens

[57] ABSTRACT

A binary coded decimal to excess 3 code converter is described which includes a plurality of EXCLUSIVE-OR gates and means for coupling the EXCLUSIVE-OR gates so that in response to BCD input signals the EXCLUSIVE-OR gates provide excess 3 coded output signals.

6 Claims, 1 Drawing Figure

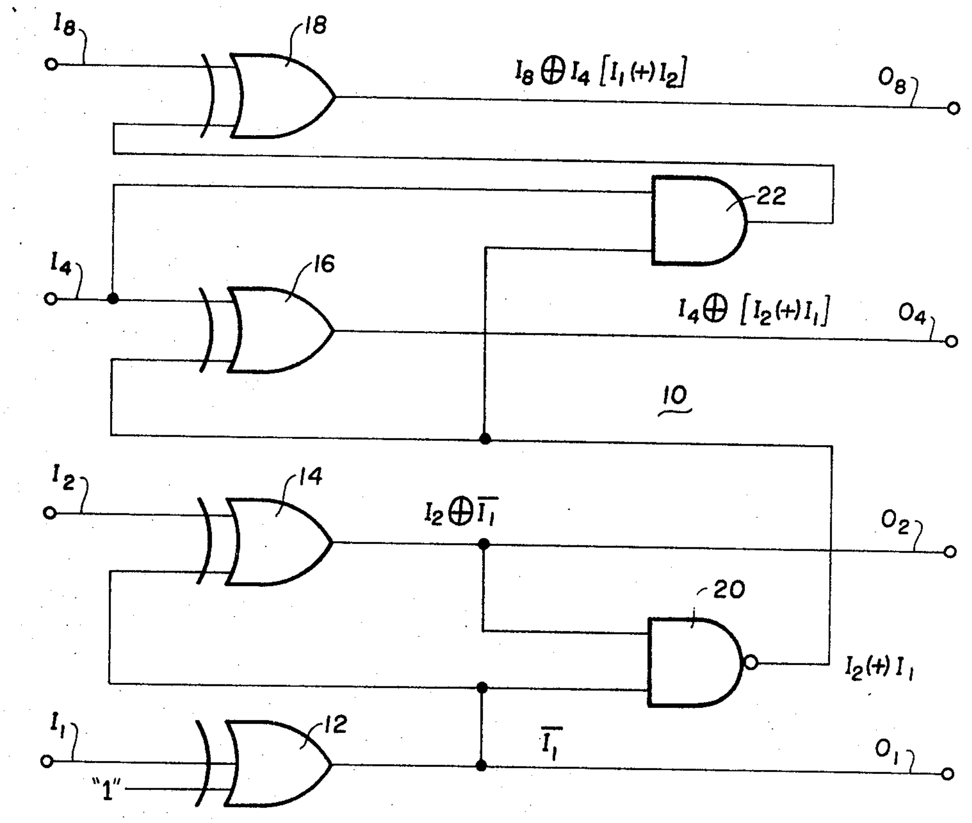
WAYNE SPANI
INVENTOR.
BY Raymond L. Owens
W. H. J. Kline
ATTORNEYS

BCD TO EXCESS 3 CODE CONVERTER

CROSS REFERENCE TO RELATED APPLICATIONS

Reference is made to commonly assigned copending U.S. Pat. application, Ser. No. 124,684, entitled "Excess 3 to BCD Code Converter," filed contemporaneously herewith in the name of Wayne Spani.

BACKGROUND OF THE INVENTION

The present invention relates to code converting apparatus and particularly to binary coded decimal to excess 3 code converters.

One of the most commonly used codes in computing apparatus is the binary coded decimal code (BCD). Often within computing apparatus, the BCD code is converted to the excess 3 code which is particularly useful where it is desired to perform arithmetic operations by the method of compliments. A conventional BCD to excess 3 code converter using 13 logic gates is shown on page 86 of "Electronic Design," Vol. 17, No. 25, Dec. 6, 1969, which was designed by a systematic procedure employing Karnaugh maps.

SUMMARY OF THE INVENTION

In the disclosed embodiment of the invention, a BCD to excess 3 converter includes a plurality of EXCLUSIVE-OR gates adapted to receive as inputs binary code decimal input signals $I_1$, $I_2$, $I_4$, and $I_8$, and circuit means for coupling the EXCLUSIVE-OR gates so that they provide excess 3 coded output signals $O_1$, $O_2$, $O_4$, and $O_8$ in accordance with the following Boolean relationships between the input and output signals:

1. $O_1 = \bar{I}_1$
2. $O_2 = I_2 \oplus \bar{I}_1$
3. $O_4 = I_4 \oplus (I_2 + I_1)$
4. $O_8 = I_8 \oplus I_4 (I_2 + I_1)$ A feature of the invention is that BCD to excess 3 code conversion is accomplished with substantial savings in the number of logic gates used.

Other objects and advantages of the invention will become more apparent from the detailed description of a preferred embodiment.

BRIEF DESCRIPTION OF THE DRAWING

In the detailed description of the preferred embodiment of the invention presented below, reference is made to the accompanying drawing which depicts a block diagram of a BCD to excess 3 code converter in accordance with the invention. The symbols for the logic components shown in the drawing are in accordance with the American Standard Graphical Symbols for Logical Diagrams (ASA Y 32.14–1962).

DESCRIPTION OF THE PREFERRED EMBODIMENT

To facilitate an understanding of the present invention, the BCD and excess 3 codes will be first briefly reviewed in conjunction with Tables I and II which show for the decimal digits O through 9 (left column) the BCD and excess 3 equivalent respectively.

TABLE I

| Decimal Digit | Binary Coded Decimal Code $I_8 I_4 I_2 I_1$ |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

TABLE II

| Decimal Digit | Excess 3 Code $O_8 O_4 O_2 O_1$ |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

As shown by Table II, the excess 3 code is a self-complementing code. More specifically, the nine's compliment of a decimal digit expressed in excess 3 code may be obtained by complimenting each particular individual bit. For example, for the decimal digit 1, the excess 3 code representation is the number 0100 whose compliment on an individual bit basis is 1011 which in the excess 3 code has a decimal equivalent of 8.

Referring now to the drawing, there is shown a BCD to excess 3 code converter 10 having a plurality of input terminals for a plurality of binary input signals $I_1$, $I_2$, $I_4$, and $I_8$ respectively and a plurality of output terminals for a plurality of excess 3 output signals $O_1$, $O_2$, $O_4$, and $O_8$ respectively. The converter 10 includes a plurality of EXCLUSIVE-OR gates 12, 14, 16, and 18. Boolean Algebra is well known to those skilled in the art to express the output signals of combinational logical systems in terms of its input signals. Upon analysis using Boolean Algebra [See Hill and Peterson, Introduction to Switching Theory Logic Design, (1968)] the disclosed code converter solves the following four Boolean equations 1–4 which present a mathematical model of the converter 10 and convert the BCD code of Table I into the excess 3 code of Table II.

Equations:

1. $O_1 = I_1$
2. $O_2 = I_2 \oplus I_1$
3. $O_4 = I_4 \oplus (I_2 + I_1)$
4. $O_8 = I_8 \oplus I_4 (I_2 + I_1)$ Referring specifically to the drawing, EXCLUSIVE-OR gate 12 is responsive to only the input signal $I_1$ and thus provides an inverter function. The gate 12 provides the output signal $O_1$ to satisfy equation 1. The EXCLUSIVE-OR gate 12 could be replaced by a signal inverter and still solve equation 1. The output of the gate 12 is also provided as an input to the EXCLUSIVE-OR gate 14 and a NAND gate 20. The EXCLUSIVE-OR gate 14 also receives input signal $I_2$ and provides output signal $O_2$ which satisfies equation 2. In addition, the output of gate 14 is provided to the NAND gate 20 which produces a first reference signal having the Boolean representation $\overline{[(I_2 \oplus \bar{I}_1)\,\bar{I}_1]}$ which can be simplified to the expression $(I_2 + I_1)$. The NAND gate 20 is directly coupled to the EXCLUSIVE-OR gate 16 and an AND gate 22. EXCLUSIVE-OR gate 16 also is responsive to the input signal $I_4$ and produces the output signal $O_4$ which satisfies equation 3.

The AND gate 22 also receives the input signal $I_4$ and provides a second reference signal $I_4(I_1 + I_2)$ which is applied as an input to the EXCLUSIVE-OR gate 18. The EXCLUSIVE-OR gate 18 also receives the input signal $I_0$ and provides the output signal $O_8$ which solves equation 4.

Although the disclosed embodiment of the present invention uses a plurality of EXCLUSIVE-OR gates, it will be understood to those skilled in the art that the EXCLUSIVE-OR function may also be realized by the correct selection of a number of other combination of gates.

The invention has been described in detail with particular reference to a preferred embodiment but it will be understood that variations and modifications can be effected within the spirit and scope of the invention.

I claim:

1. In a BCD to excess 3 code converter for converting binary input signals $I_1$, $I_2$, $I_4$, and $I_8$ to excess 3 output signals $O_1$, $O_2$, $O_4$, and $O_8$, the combination comprising:

a. a plurality of EXCLUSIVE-OR means;

b. circuit means defining a plurality of input terminals for the binary input signals $I_1$, $I_2$, $I_4$, and $I_8$ and a plurality of output terminals for excess 3 output signals $O_1$, $O_2$, $O_4$, and $O_8$; and c. means for coupling said EXCLUSIVE-OR means to said terminals to establish the following Boolean relationships between the input signals and the output signals:

1. $O_1 = \bar{I}_1$
2. $O_2 = I_2 \oplus I_1$
3. $O_4 = I_4 \oplus (I_2 + I_1)$
4. $O_8 = I_8 \oplus I_4 (I_2 + I_1)$

2. In a BCD to excess 3 code converter for converting binary input signals $I_1$, $I_2$, $I_4$, and $I_8$ to excess 3 output signals $O_1$, $O_2$, $O_4$, and $O_8$, the combination comprising:

a. at least three EXCLUSIVE-OR gates, each responsive to a selected one of the BCD input signals and adapted to provide a selected output signal; and b. means coupling the EXCLUSIVE-OR gates to satisfy the following Boolean relationships between the input and output signals:

1. $O_1 = \bar{I}_1$
2. $O_2 = I_2 \oplus I_1$
3. $O_4 = I_4 \oplus (I_2 + I_1)$
4. $O_8 = I_8 \oplus I_4 (I_2 + I_1)$

3. In a BCD to excess 3 code converter for converting binary input signals $I_1$, $I_2$, $I_4$, and $I_8$ to excess 3 output signals $O_1$, $O_2$, $O_4$, and $O_8$, the combination comprising:

a. inverting means responsive to the $I_1$ signal for providing the $O_1$ signal;

b. first EXCLUSIVE-OR gate means responsive to the $I_2$ and $O_1$ signal for providing the $O_2$ signal;

c. means responsive to $O_1$ and $O_2$ signals to provide a first reference signal;

d. second EXCLUSIVE-OR gate means responsive to the $I_4$ signal and said first reference signal to provide the $O_4$ signal;

e. means responsive to said first reference signal and the $I_4$ signal to provide a second reference signal; and f. third EXCLUSIVE-OR gate means responsive to said second reference signal and the $I_8$ signal to provide the $O_8$ signal.

4. The invention as set forth in claim 3 wherein said inverting means comprises an EXCLUSIVE-OR gate.

5. The invention as set forth in claim 3 wherein said first reference signal providing means comprises a NAND gate.

6. The invention as set forth in claim 5 wherein said second reference signal providing means comprises and AND gate.

* * * * *